Feb. 14, 1939.   V. SEKLEHNER   2,146,859
SUCTION SUPPORTING DEVICE
Filed Dec. 4, 1936
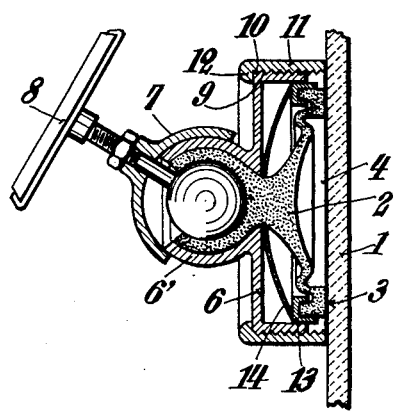
V. Seklehner, Inventor
by Louis Shumacher, attorney Patented Feb. 14, 1939

2,146,859

UNITED STATES PATENT OFFICE 2,146,859

SUCTION SUPPORTING DEVICE

Viktor Seklehner, Vienna, Austria, assignor of one-half to Ludwic August Wilczek, Vienna, Austria Application December 4, 1936, Serial No. 114,095
In Austria December 10, 1935

1 Claim. (Cl. 248—206)

It is already known to securely attach cup-shaped suckers of soft rubber or the like to smooth walls by positively enlarging the hollow or vacuum space of the sucker in the course of attachment, in order to produce a powerful vacuum, this being effected for instance by holding down the border or rim of the sucker on to the wall to which it is to be attached and pulling up the wall of the sucker by means of a screw and nut. If this kind of attachment is applied to a rear-view mirror for motor cars, particularly to a hinged mirror the drawback will arise when travelling that the image, appearing in the mirror will be very shaky.

Now the present invention relates to an adjustable mirror, particularly to a rear view mirror for motor cars of the kind provided with a combined joint and sucker attachment in which the vacuum space of the sucker is enlarged by withdrawing the middle portion of the sucker from its supporting surface and its characteristic feature consists in the provision of means rigidly supporting the joint of the mirror on the supporting surface, without interposing elastic substances, so that the shaking of the mirror is rendered impossible.

Hence shocks cannot effect any movement of the centre of the joint and thus of the mirror with respect to the supporting surface, in contradistinction to known constructions in which the mirror is supported solely by the border or rim of the interposed cup-shaped rubber sucker and in which forces produced by the shocks cause an additional deformation and consequently effect a change of the position of the mirror.

One mode of carrying out the present invention is illustrated by way of example in longitudinal section on the accompanying drawing.

The border or rim 3 of a cup-shaped sucker 2 is firmly pressed on to the front glass screen 1 of a vehicle. In the illustrated embodiment, the end or head portion of the sucker removed from the cup-shaped part of the sucker is shaped substantially semi-spherical and is clamped between the cup-shaped end 6' of an annular joint-support 6 and the spherical end of the holder of a mirror 8. A semi-spherical joint 7 is attached to the holder of said mirror and co-operates with the cup-shaped end 6' of the joint-support 6, and the annular part of the latter is provided with an external screw thread 9, which engages the internal screw thread 10 of a tensioning sleeve 11. In the attached condition, the joint-support 6 does not rest on the screen 1 but co-operates with a stop 12 of the tensioning sleeve 11, whereby the latter bears against the screen 1. A strengthening ring 13 and a plate spring 14 promote the contact of the sucker-rim 3 with the screen 1 when attaching the device to the latter.

The plate spring is assembled in the device in that, at first, the head portion of the sucker 2 is passed through a central hole of the plate spring 14 and subsequently the sucker-head is clamped in the universal joint 7, whereby the plate spring rests with its outer end on the strengthening ring 13, while the middle portion thereof bears against the inner wall of the joint-support 6.

In the detached condition, the tensioning sleeve 11 is screwed up on the joint-support 6 so far that the said sleeve does not co-operate any more with the glass screen 1, so that now the plate spring 14 presses down and on to said glass screen the base rim 3 of the cup-shaped sucker 2, whereby the centre 4 of the latter only just touches the glass screen 1. Now if the joint-support 6 is held against the glass screen 1 and if the tensioning sleeve 11 is screwed down, the latter bears against the glass screen 1 and, on continuing the screwing action, the joint-support 6 will be screwed away from the screen 1 in view of the co-operation between the latter and the tensioning sleeve 11. In view thereof that the sucker 2 is clamped in the universal joint 7 and that the joint-support 6 is screwed away from the screen 1, only the centre 4 of the base of the sucker is lifted away from the screen 1, while the base-rim 3 of the sucker is forced firmly on to the screen 1, in view of the pressure exerted by the spring 14 upon the ring 13 of the sucker. This operation is continued until the joint-support 6 cooperates with the stop 12 of the tensioning sleeve 11, so that a vacuum is produced in the space between the screen 1 and the centre 4 of the base of the sucker. In view thereof, the device is rigidly secured to the screen 1.

If, when driving, stresses in different directions are caused in view of the shocks, components of the forces, which act in a direction parallel to the glass screen 1, cannot effect the movement of the mirror 8 around the centre of the joint owing to the friction within the joint 7.

What I claim is:

In a vacuum support, a cup like member having a threaded side wall and an element of a ball and socket joint projecting outwardly from the bottom thereof, a suction cup disposed within said first named cup and having a portion extending into said joint element for grippingly engaging the second member of said joint, a bowed spring disposed between said cup elements with its margin pressing upon the margin of the suction cup, and a ring threaded on said side wall of said first named cup and adapted to be adjustably applied to the support engaged by the suction cup for limiting vibration of the suction cup and for drawing it outwardly from the support for increasing the vacuum therein.

VIKTOR SEKLEHNER.